(12) United States Patent
Bell et al.

(10) Patent No.: US 10,724,655 B2
(45) Date of Patent: Jul. 28, 2020

(54) LOW-PIM CABLE SUPPORT BRACKETS

(71) Applicant: ConcealFab Corporation, Colorado Springs, CO (US)

(72) Inventors: Thomas Bell, Colorado Springs, CO (US); Robert Kola, Colorado Springs, CO (US); Steve Rogers, Colorado Springs, CO (US)

(73) Assignee: ConcealFab Corporation, Colorado Springs, CO (US)

( * ) Notice: Subject to any disclaimer, the term of this patent is extended or adjusted under 35 U.S.C. 154(b) by 0 days.

(21) Appl. No.: 16/450,925

(22) Filed: Jun. 24, 2019

(65) Prior Publication Data

US 2019/0390797 A1    Dec. 26, 2019

Related U.S. Application Data

(60) Provisional application No. 62/689,616, filed on Jun. 25, 2018.

(51) Int. Cl.
    *F16L 3/12*      (2006.01)
    *F16L 3/137*    (2006.01)

(52) U.S. Cl.
    CPC ............. *F16L 3/1222* (2013.01); *F16L 3/137* (2013.01)

(58) Field of Classification Search
    CPC ........ F16L 3/1222; F16L 3/137; A01M 31/02; G09F 2007/1804; G09F 2007/1834; F16M 13/02
    USPC .......... 248/73, 218.4, 219.1, 229.15, 229.25, 248/228.6, 230.6, 231.71, 227.1, 72, 68.1
    See application file for complete search history.

(56) References Cited

U.S. PATENT DOCUMENTS

1,802,939 A  *   4/1931   Butler ....................... G09F 7/18
                                                           40/607.12
2,663,531 A  *   12/1953   Rubano .................. A47B 97/04
                                                           248/229.17

(Continued)

OTHER PUBLICATIONS

SitePro1 a Valmont Company (website), https://www.sitepro 1.com/store/cart. ph p?m=product_list&c= 1, Oct. 21, 2006.

(Continued)

*Primary Examiner* — Nkeisha Smith
(74) *Attorney, Agent, or Firm* — Mehrman Law Office; Michael J. Mehrman

(57) ABSTRACT

Low-PIM polymeric cable support brackets are used to support cables feeding antennas and other types of equipment at cellular base stations (cell sites). A variety of polymeric mounting brackets, cable ties, cable support blocks, and stackable hangers are used to eliminate loose fitting metal-to-metal contact points that tend to create PIM. The mounting bracket body may include standoff features allowing the same bracket to securely attach to poles of different diameter, an external hex profile for receiving a wrench, and a fitted receptacle for receiving a bracket end fastener to facilitate installation. Polymeric cable ties fed through cable slots in the mounting bracket may be positioned to prevent the bracket end fastener from falling out of the fitted receptacle. The low-PIM cable support brackets are suitable for use within one carrier wavelength behind and around base station antennas where conventional cable brackets have been identified as problematic PIM interference sources.

19 Claims, 8 Drawing Sheets

(56) References Cited

U.S. PATENT DOCUMENTS

| | | | | |
|---|---|---|---|---|
| 2,689,995 | A * | 9/1954 | Smith | B01L 9/50 285/61 |
| 2,708,087 | A * | 5/1955 | Blackstone | H01F 27/06 211/107 |
| 3,012,750 | A * | 12/1961 | Schermerhorn, Jr. | A47B 57/56 248/230.9 |
| 3,023,989 | A * | 3/1962 | White | F16L 3/2235 248/68.1 |
| 3,298,717 | A * | 1/1967 | Rothwell | F16L 41/12 285/197 |
| 3,933,377 | A * | 1/1976 | Arrowood | F16L 3/00 285/61 |
| T100,605 | I4 * | 5/1981 | Christian | H02G 3/24 174/166 R |
| 4,548,377 | A * | 10/1985 | Huel | G09F 7/18 248/219.1 |
| 4,671,872 | A * | 6/1987 | Cramer | B01F 7/00741 210/219 |
| 4,880,195 | A * | 11/1989 | Lepley | G09F 17/00 248/219.4 |
| 5,098,051 | A * | 3/1992 | Aldridge | G09F 7/18 248/219.4 |
| 5,193,774 | A * | 3/1993 | Rogers | H01F 27/06 211/107 |
| 5,335,889 | A * | 8/1994 | Hopkins | G09F 7/18 248/219.4 |
| 5,463,973 | A * | 11/1995 | Tait | G09F 17/00 116/173 |
| 5,702,077 | A * | 12/1997 | Heath | F16L 3/14 248/59 |
| 5,702,081 | A * | 12/1997 | Gallemore, II | A47B 96/061 248/218.4 |
| 5,769,112 | A * | 6/1998 | Rendina | E03B 9/04 137/272 |
| 5,794,897 | A * | 8/1998 | Jobin | H02G 7/053 24/459 |
| 6,443,402 | B1 | 9/2002 | Ferrill et al. | |
| 6,502,796 | B1 * | 1/2003 | Wales | E03C 1/06 248/230.1 |
| 6,899,305 | B2 | 3/2005 | Korczak et al. | |
| 6,994,300 | B2 * | 2/2006 | Labeirie | B64C 1/406 248/65 |
| 7,594,631 | B1 * | 9/2009 | Carnevali | B60R 11/0241 248/219.4 |
| 7,614,593 | B2 * | 11/2009 | McClure | E21B 17/1035 248/229.14 |
| 7,793,988 | B1 * | 9/2010 | Shemtov | F16L 3/1211 248/59 |
| 7,810,265 | B2 * | 10/2010 | Beatty | G09F 17/00 116/173 |
| 7,861,982 | B1 * | 1/2011 | McClure | E21B 19/02 248/74.1 |
| 8,011,621 | B2 | 9/2011 | Korczak | |
| 8,342,474 | B2 * | 1/2013 | Gilbreath | F16L 3/222 165/162 |
| 8,695,929 | B2 * | 4/2014 | Cox | H02G 3/0493 174/100 |
| 8,863,419 | B1 * | 10/2014 | Pace | G09F 15/00 248/218.4 |
| 8,882,066 | B2 * | 11/2014 | Otten | B65D 63/00 248/230.8 |
| 9,038,967 | B2 * | 5/2015 | Struck | F16L 3/2235 248/68.1 |
| 9,086,175 | B2 | 7/2015 | Feige | |
| 9,267,624 | B2 * | 2/2016 | Railsback | F16L 3/2235 |
| 9,360,135 | B1 * | 6/2016 | McClure | F16L 3/1075 |
| 9,400,082 | B2 * | 7/2016 | Webster | F16M 13/022 |
| 9,683,681 | B2 * | 6/2017 | Heath | F16L 3/133 |
| 9,853,434 | B2 | 12/2017 | Vaccaro | |
| 9,866,004 | B2 | 1/2018 | Vaccaro | |
| 9,869,331 | B2 * | 1/2018 | Muntasser | F16B 2/08 |
| 9,903,510 | B2 | 2/2018 | Joshi et al. | |
| 9,995,414 | B2 | 6/2018 | Joshi et al. | |
| 10,158,218 | B2 | 12/2018 | Vaccaro et al. | |
| 10,243,339 | B2 | 3/2019 | Vaccaro et al. | |
| 10,253,906 | B2 | 4/2019 | Vaccaro | |
| 10,422,446 | B2 | 9/2019 | Joshi et al. | |
| 10,522,059 | B1 * | 12/2019 | Greilanger | G09F 7/18 |
| 2002/0066833 | A1 | 6/2002 | Ferrill et al. | |
| 2005/0029419 | A1 * | 2/2005 | Ware | F16L 3/137 248/218.4 |
| 2006/0237597 | A1 * | 10/2006 | D'Andria | A61M 5/1418 248/68.1 |
| 2009/0146029 | A1 * | 6/2009 | Beatty | G09F 7/18 248/206.5 |
| 2009/0230266 | A1 * | 9/2009 | Hillstrom | G09F 7/18 248/230.9 |
| 2009/0294602 | A1 | 12/2009 | Korczak | |
| 2011/0186693 | A1 * | 8/2011 | McMiles | F16L 3/08 248/65 |
| 2011/0198548 | A1 * | 8/2011 | Walker, Jr. | A01K 3/005 256/10 |
| 2012/0280092 | A1 * | 11/2012 | Barre | F16L 3/1091 248/68.1 |
| 2014/0008380 | A1 * | 1/2014 | Zou | F16M 13/02 220/752 |
| 2014/0086704 | A1 | 3/2014 | Hemingway et al. | |
| 2015/0160537 | A1 * | 6/2015 | Bier | G03B 17/561 248/219.4 |
| 2019/0195251 | A1 * | 6/2019 | Bodwell | E04B 9/00 |

OTHER PUBLICATIONS

Petrilla Technologies, LLC (website), https://petrillatechnologies.com/support-accessories.html, Mar. 24, 2017.

CommScope (website), https://www.commscope.com/catalog/tools_accessories/product.aspx?id=46, Oct. 28, 2012.

Fimo, "Product Data Sheet, BAP 10, Plastic Socle for BFI 10 Threaded Bars" Apr. 13, 2016 (and associated photograph).

* cited by examiner

LOW-PIM CABLE SUPPORT BRACKETS

REFERENCE TO RELATED APPLICATION

This application claims priority to U.S. Provisional Patent Application Ser. No. 62/689,616 filed Jun. 25, 2018, which is incorporated by reference.

TECHNICAL FIELD

The present invention is directed to cellular communication systems and, more particularly, to a low-PIM cable bracket used to reduce PIM (passive intermodulation) interference at cellular telephone base station antenna sites.

BACKGROUND

An essential element of modern mobile communications systems is the cellular telephone base station, also known as a "cell site." The cell site includes one or more directional base station antennas aimed at a desired geographical area of coverage with coaxial cables connecting the antennas to base station radio equipment. The performance of a cell site is often limited by passive intermodulation (PIM) interference. PIM interference occurs when the high-power downlink signals transmitted by the base station antennas mix at passive, non-linear junctions in the RF path, creating new signals known as intermodulation products. When these intermodulation products fall in an operator's uplink band, they act as interference and reduce the SINR (signal to interference plus noise ratio). As the SINR is reduced, the geographic coverage and data capacity of the cell site is reduced.

It is well documented that loosely touching metal-to-metal surfaces can behave in a non-linear fashion and become sources of PIM interference when illuminated by high power RF (radio frequency) signals. Recently, it has been determined that loose metal-to-metal connections located behind base station antennas are also able to generate high levels of PIM interference. Even though this region is well outside the main beam of the antenna, enough RF energy is present in this region to excite non-linear objects and generate PIM interference. Based on field measurements it has been determined that loose metal-to-metal contacts located very close to base station antennas (within one wavelength of the carrier frequency) are more likely to generate high levels of PIM interference than loose metal-to-metal contacts located farther away (greater than 1 wavelength) from base station antennas.

A common source of loose metal-to-metal contact found in the region close to the base station antenna is metal brackets and associated hardware for supporting coaxial cables. Coaxial cables, typically ½-inch in diameter, are used to transfer RF signals between tower mounted radio equipment and the base station antenna. These cables need to be mechanically supported periodically along their length to prevent movement of the cable in the wind. The metal antenna mounting pipe close to the back of the base station antenna provides a convenient rigid surface to mechanically secure these coaxial cables. At operating frequencies at or below 2 GHz, this mounting pipe is typically located within one wavelength of the antenna within the zone of high PIM concern.

Two different methods for mechanically supporting coaxial cables are commonly found at cell sites. The first utilizes two plastic clamp blocks that fit around one or more coaxial cables. An example of this style cable support block is disclosed in U.S. Pat. No. 5,794,897 to Jobin et al, which is incorporated by reference. A ⅜-inch or 10 mm diameter stainless steel threaded fastener is inserted through the support block pairs and stainless-steel hardware is installed to clamp the plastic block halves together on the threaded fastener. A steel interface bracket is often attached to one end of the threaded fastener using nuts and lock washers. The interface bracket is then secured to the antenna mounting pipe or other nearby metal members using a stainless-steel hose clamp. The hose clamp provides a convenient method for securing interface brackets to metal members since the hose clamp conforms easily to different shapes and is adjustable in length allowing it to fit around a wide variety of metal member sizes.

A second system for mechanically supporting coaxial cables uses metal "snap-in" style single-cable cable hangers. The snap-in cable hangers are made from thin "U" or "C" shaped stainless-steel members designed to wrap around individual coaxial cables. The hangers include locking features able to insert into round holes in supporting interface brackets. Once inserted, the locking features on the hanger expand outward to secure the cable to the interface bracket. Variations of this hanger design include holes on one end of the hanger to accept additional cable hangers. This enables multiple coaxial cables to be secured to a single interface bracket by stacking one hanger on top of another. Examples of this style cable hanger is disclosed in U.S. Pat. No. 6,899,305 to Korczak et al., which is incorporated by reference. The interface brackets used to support this style of hanger are also commonly secured to the antenna mounting pipe or other nearby metal members using stainless-steel hose clamps.

Multiple sources of PIM interference are present with these conventional cable support designs. First, if the hose clamp used to secure the interface bracket to the antenna mounting pole is not tightened sufficiently, PIM can be generated at the loose metal-to-metal contact between the hose clamp and the antenna mounting pipe and at the loose metal-to-metal contact between the interface bracket and the antenna mounting pipe. Second, even if tightened sufficiently, there is potential for PIM generation at the free end of the hose clamp beyond the tightening mechanism where the steel banding is able to lightly contact itself as well as other metal objects. Third, hose clamps are typically constructed from stainless-steel and antenna mounting pipes are typically constructed from galvanized steel. Galvanized steel and stainless steel are dissimilar metals at opposite ends of the galvanic series. Small pockets of corrosion can form over time between the two dissimilar metals that generate passive intermodulation. PIM can also be generated at metal-to-metal contacting surfaces between stacked metal snap-in style cable hangers and at the metal-to-metal contacting surface between the interface bracket and the snap-in hanger.

Manufacturers such as Commscope have recently introduced plastic versions of their stackable snap-in style cable hangers that will eliminate some of the PIM producing interfaces. U.S. Pat. No. 10,253,906 to Vaccaro, which is incorporated by reference, describes this product. The plastic snap-in style hangers do not, however, eliminate PIM associated with hose clamps or the PIM generated at the metal-to-metal contact between the metal interface bracket to antenna mounting pipe. In addition, FIMO, an Italian manufacture, sells the "BAP-10" plastic cable bracket, which eliminates some sources of PIM in the cable bracket interface. However, this device has an arcuate pole interface fitted to a specific pole size, which limits each cable bracket to a pole with a specific diameter.

Heavy duty plastic cable ties are available as a low PIM replacement for hose clamps for attaching metal interface brackets to metal support members at the cell site. These heavy duty plastic cable ties do not, however, eliminate PIM generated at the metal-to-metal contacts between the metal interface bracket and metal support members.

A reliable, inexpensive, easy to deploy cable support solution is needed to secure coaxial cables to antenna mounting pipes and other steel members in close proximity to base station antennas without generating passive intermodulation. It is desirable that this solution be able to re-use existing deployed hardware where possible to reduce cost.

SUMMARY

The present invention meets the needs described above through low-PIM cable support brackets used to support cables feeding antennas and other types of equipment at cellular base stations (cell sites). A variety of polymeric mounting brackets, cable ties, cable support blocks, and stackable hangers are used to eliminate loose fitting metal-to-metal contact points that tend to create PIM. Illustrative embodiments include mounting brackets with standoff features allowing the same bracket to securely attach to poles of different diameter, an external hex profile for receiving a wrench, and a fitted receptacle for receiving a bracket end fastener to facilitate installation. Polymeric cable ties fed through cable slots in the mounting bracket may be positioned to prevent the bracket end fastener from falling out of the fitted receptacle. The low-PIM cable support brackets are suitable for use within one carrier wavelength typically behind and around cellular base station antennas where conventional cable brackets have been identified as problematic PIM interference sources.

It will be understood that specific embodiments may include a variety of features in different combinations, as desired by different users. The specific techniques and systems for implementing particular embodiments of the invention and accomplishing the associated advantages will become apparent from the following detailed description of the embodiments and the appended drawings and claims.

BRIEF DESCRIPTION OF THE FIGURES

The numerous advantages of the embodiments of the invention may be better understood with reference to the accompanying figures.

DETAILED DESCRIPTION

Figure 1:
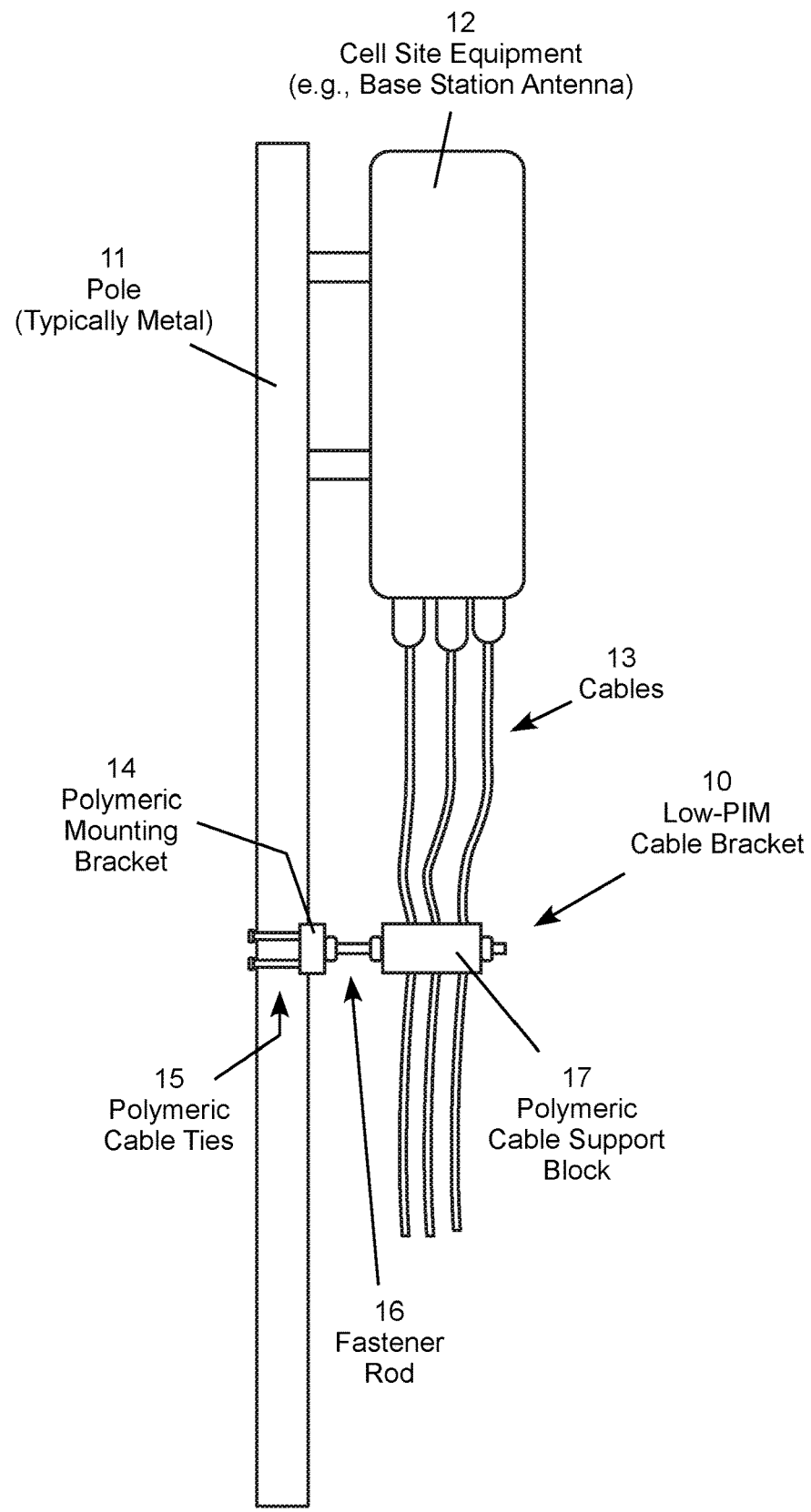
FIG. 1 is a side view of a portion of a cellular base station antenna site using a low-PIM cable bracket.

Embodiments of the invention include low-PIM cable brackets using polymeric (non-metallic) components to eliminate loose fitting metal-to-metal connections that have been found to be problematic PIM generation points. For example, the polymeric components typically include an injection molded plastic mounting bracket, polymeric cable ties, and a polymeric cable support block. The low-PIM cable bracket is particularly well suited for use within one carrier wavelength behind and around a cellular base station antenna to eliminate problematic PIM interference generated by conventional cable brackets. The polymeric mounting bracket includes a pair of spaced apart standoff features, such as contact ridges, that allow the same mounting bracket to be secured to a wide range of support poles or pipes with different diameters. Several different types of polymeric mounting brackets can each be used to support a variety of polymeric cable support blocks, such as stackable single-cable hangers, two-cable support blocks, six-cable support blocks, and so forth. Particular embodiments include different varieties of polymeric multi-hanger brackets that, in turn, support multiple stacks of polymeric single-cable hangers.

Each type of low-PIM cable bracket is therefore a multi-function injection molded plastic interface bracket that can be securely attached to poles having a range of different diameters. The low-PIM cable bracket further supports the mounting hardware required for plastic clamp style cable support blocks as well as polymeric or metal interface brackets used with stackable snap-in single-cable hangers. A key element of the design is the polymeric mounting bracket, typically fabricated from injection molded plastic, to eliminate metal-to-metal contact between the mounting bracket and the usually metal pole, metal support members, and between the bracket and metal interface brackets installed at the cell site. The polymeric bracket includes standoff features, such as parallel ridges, as the pole contact points enabling secure attachment to poles with a wide range of pipe diameters.

The polymeric mounting bracket also includes molded-in features to accept threaded fasteners of different lengths and resist rotation of the fastener when hardware is installed and torqued to >10 FT-LB on one side of the bracket. Example fasteners include long threaded bolts for supporting one or more pairs of clamp style cable support blocks and short threaded bolts for supporting polymeric or metal interface brackets used with plastic stackable snap-in style single-cable hangers. The polymeric mounting brackets also mount to interface brackets that accept multiple stacks of snap-in cable hangers with integral locking features for securing polymeric or metal interface brackets to the mounting bracket. The polymeric mounting bracket also includes molded-in features to locate and constrain the position of one or more heavy duty, weather resistant polymeric cable ties to secure the mounting bracket to a steel pole or similar support structure at the cell site, such as a vertical mast or horizontal support member. Features used to locate the cable tie on the mounting bracket are designed to prevent the cable ties from slipping up or down with respect to the mounting bracket. These features include a groove that a cable tie is tightened upon, slots that the cable tie extends through, and divided slot used to position two cable ties in side-by-side position.

FIG. 1 is a side view of a portion of a cell site using a first type of low-PIM cable bracket 10. The illustrated portion of the cell site includes a pipe or pole 11 supporting cell site equipment, in this example a base station antenna 12 from which a number of cables 13 extend. The low-PIM cable bracket 10 is attached to the pole 11 in position to support the cables 13. While the base station antenna 12 attached to the pole 11 is illustrated, the low-PIM cable bracket 10 can be attached to any other suitable type of bracket or other support structure, and used to support cables extending from any other type of cell site equipment, such as an antenna, radio, amplifier, diplexer, filter and so forth. The low-PIM cable bracket 10 avoids generating PIM through the use of polymeric (non-metallic) components, in this example including a polymeric mounting bracket 14, polymeric cable ties 15, and polymeric cable support block 17. The polymeric mounting bracket 14 is connected to the polymeric cable support block 17 by a fastener rod 16, such as a threaded rod or bolt and associated nuts.

While the illustrated polymeric mounting bracket 14 is shown attached to a pole, it may be configured to attach to any suitable bracket or other support structure, such as a bracket with a square cross-section, an angle bracket, and so forth. Similarly, while two polymeric cable ties 15 are illustrated, alternate embodiments may use a single cable tie, three cable ties, or another number of cable ties suitable for the particular embodiment. In addition, alternate embodiments of the polymeric cable support block 17 may support a smaller or larger number of cables than the illustrated embodiment. The fastener rod 16 may generally be polymeric or metal. Polymeric nuts may be used with a metal fastener rod, and a polymeric snap-in fastener may be suitable when connecting the mounting bracket to a metal part, such as a metal interface bracket, to avoid a metal-to-metal contact point at the interface between the fastener and the metal interface bracket.

Figure 2:
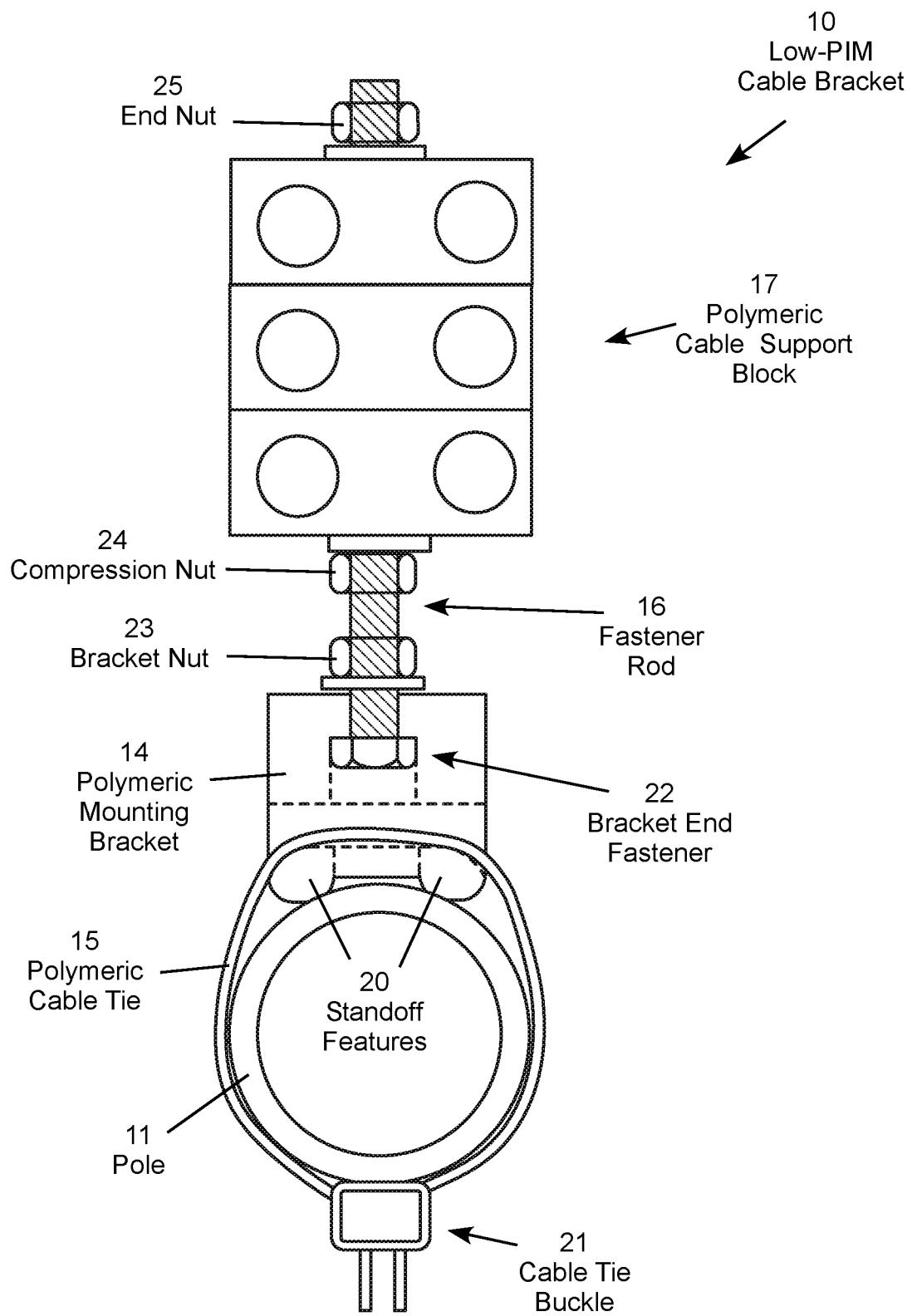
FIG. 2 is a top view of the low-PIM cable bracket.

FIG. 2 is a top view of an illustrative embodiment of the low-PIM cable bracket 10 attached to the pole 11 with a representative polymeric cable tie 15 secured by a polymeric cable tie buckle 21. In this embodiment, the polymeric mounting bracket 14 includes a pair of spaced-apart standoff features 20 that contact the pole 11. The standoff features, in this example spaced-apart contact ridges 20, avoid limiting the mounting bracket 14 to a pole with a specific diameter, which would be the case if the mounting bracket had an arcuate contact profile matching a pole with a specific diameter. This allows the same polymeric mounting bracket 14 to attach a wide range of poles with different diameters. While a pair of radiused contact ridges 20 are utilized in the representative embodiment, other types of standoff features may be used to allow the same cable bracket to securely attach to a range of poles of different diameters, such as standoff features that are angled, pointed, toothed, dimpled, knurled, serrated, ribbed and so forth. Although a pair of standoff features is considered sufficient in the illustrative embodiments, additional standoff features may be included as a matter of design choice.

In this embodiment, the fastener rod 16 is a bolt or threaded rod with a bracket end fastener 22 (e.g., bolt head or end nut) that is received into a fitted receptacle in the mounting bracket 14 so that other nuts on the fastener rod can be tightened without putting a wrench on the bracket end fastener. The bracket end fastener 22 and a bracket nut 23 are used to tighten the mounting bracket 14 to one end of the fastener rod 16, while a compression nut 24 and an end nut 25 are used to tighten the cable support block 17 to another position along the fastener rod 16, such as the opposing end of the fastener rod. This allows the cable support block 17 and the mounting bracket 14 to be securely spaced apart along the fastener rod 16. The fastener rod may extend further beyond the cable support block 17 allowing another cable support block to be secured at another location along the fastener rod.

Figure 3:
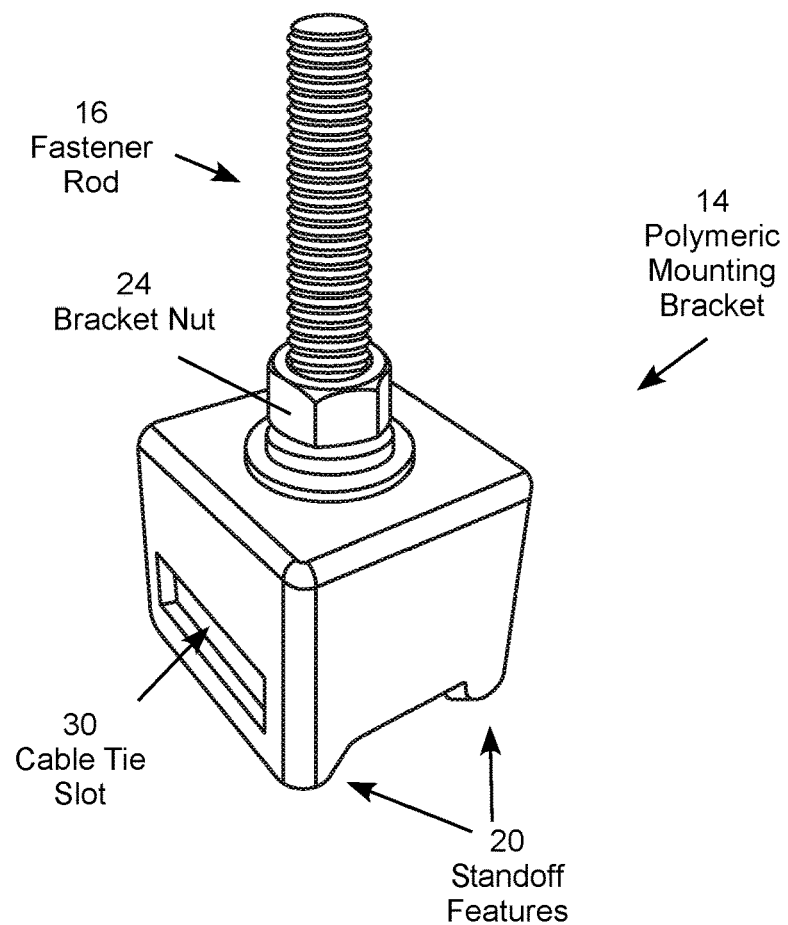
FIG. 3 is a top perspective view of a low-PIM mounting bracket.
Figure 4:
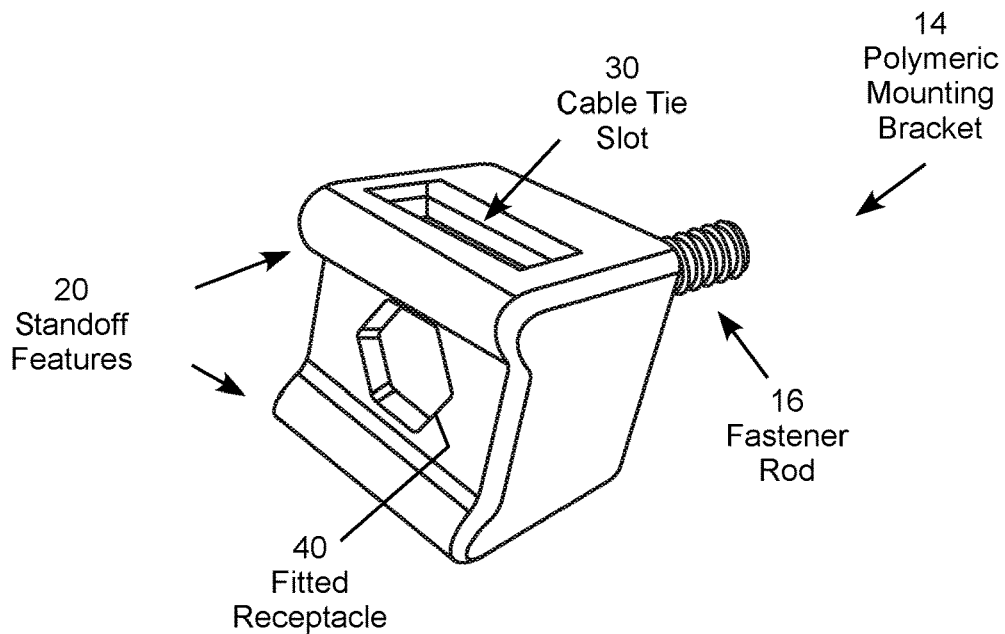
FIG. 4 is bottom perspective view of the low-PIM mounting bracket.

FIG. 3 is a top perspective view and FIG. 4 is bottom perspective view of the polymeric mounting bracket 14. This embodiment includes a pair of cable tie slots 30 through which one or two cable ties are extend to attach the mounting bracket to a pole (while only one slot is shown in the illustration, the mounting bracket 14 includes a matching slot on the opposing side of the bracket, which is hidden from view). The spaced apart standoff features 20 allow the mounting bracket 14 to securely mount to poles of different diameter. The fitted receptacle 40 receives a bracket end fastener (e.g., bolt head or end nut) of the fastener rod 16 to allow the mounting bracket to be tightened against a pole or other mounting member without putting a wrench on the bracket end fastener. In addition, a cable tie inserted through the cable tie slots 30 holds the bracket end fastener received in the fitted receptacle 40 in place, which facilitates installation by preventing the bracket end fastener from inadvertently falling out of the mounting bracket 14 while installing the mounting bracket on a pole or other support member.

As an alternative applicable to all of the illustrative embodiments, in lieu of the cable tie slots, the mounting bracket body may include integral (built-in or pre-attached) cable tie halves extending from opposing sides of the mounting bracket body. In this case, the mounting bracket body may also include a detent feature in the fitted receptacle (e.g., a dimple on a face of the fitted receptacle) or a clip that fastens across the fitted receptacle after the bracket end fastener (e.g., the head of a bolt or end nut) has been received in the fitted receptacle to prevent the bracket end fastener from falling out of the fitted receptacle.

Figure 5A:
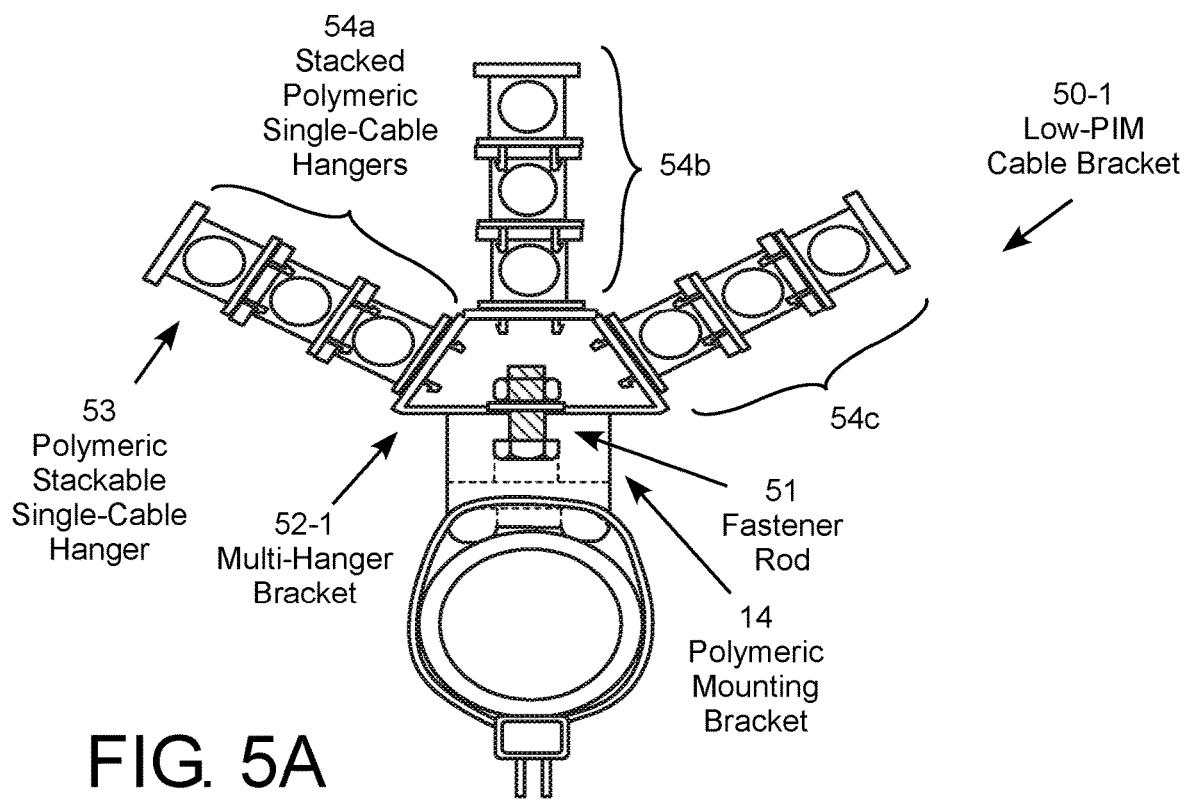
FIG. 5A is a top view of another type of low-PIM cable bracket with a first type of multi-hanger bracket.

FIG. 5A is a top view of another type of low-PIM cable bracket 50-1. In this embodiment, the mounting bracket 14 is attached to a four-sided multi-hanger bracket 52-1, which has one side attached to the mounting bracket 14 and other three sides positioned to receive one or more polymeric stackable single-cable hangers 53. This particular example includes three sets 54a-c of three stacked single-cable hangers 53 with each stack extending from a respective side of the multi-hanger bracket 52-1. Each side of the multi-hanger bracket 52-1 is typically manufactured with a hole sized to receive the mounting bracket 14 or a standard stackable single-cable hanger 53. To provide one specific example, the stackable single-cable hanger 53 may be of the type described in U.S. Pat. No. 10,253,906 to Vaccaro, which is incorporated by reference. While conventional multi-hanger brackets are typically metallic, the bracket 52-1 may alternatively be polymeric to provide additional PIM suppression.

Figure 5B:
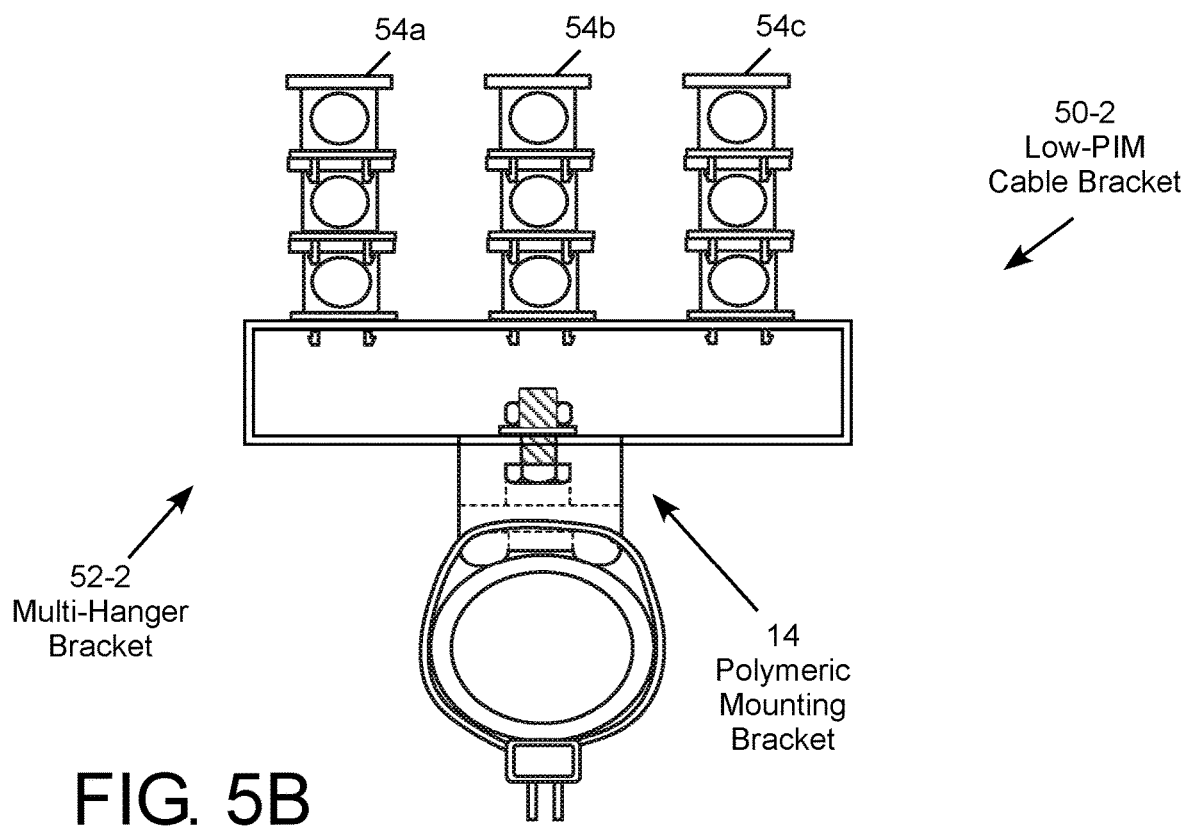
FIG. 5B is a top view of another type of low-PIM cable bracket with a second type of multi-hanger bracket.
Figure 5C:
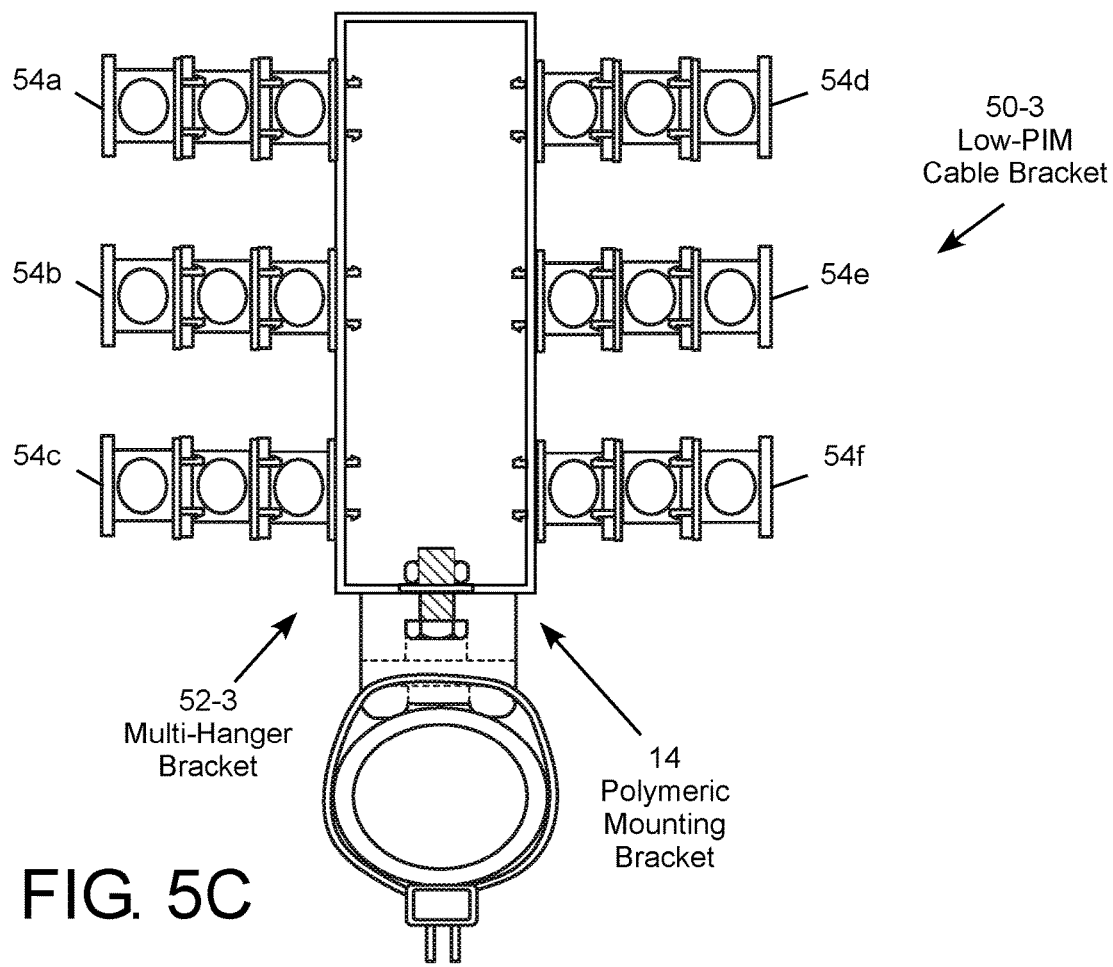
FIG. 5C is a top view of another type of low-PIM cable bracket with a third type of multi-hanger bracket.
Figure 5D:
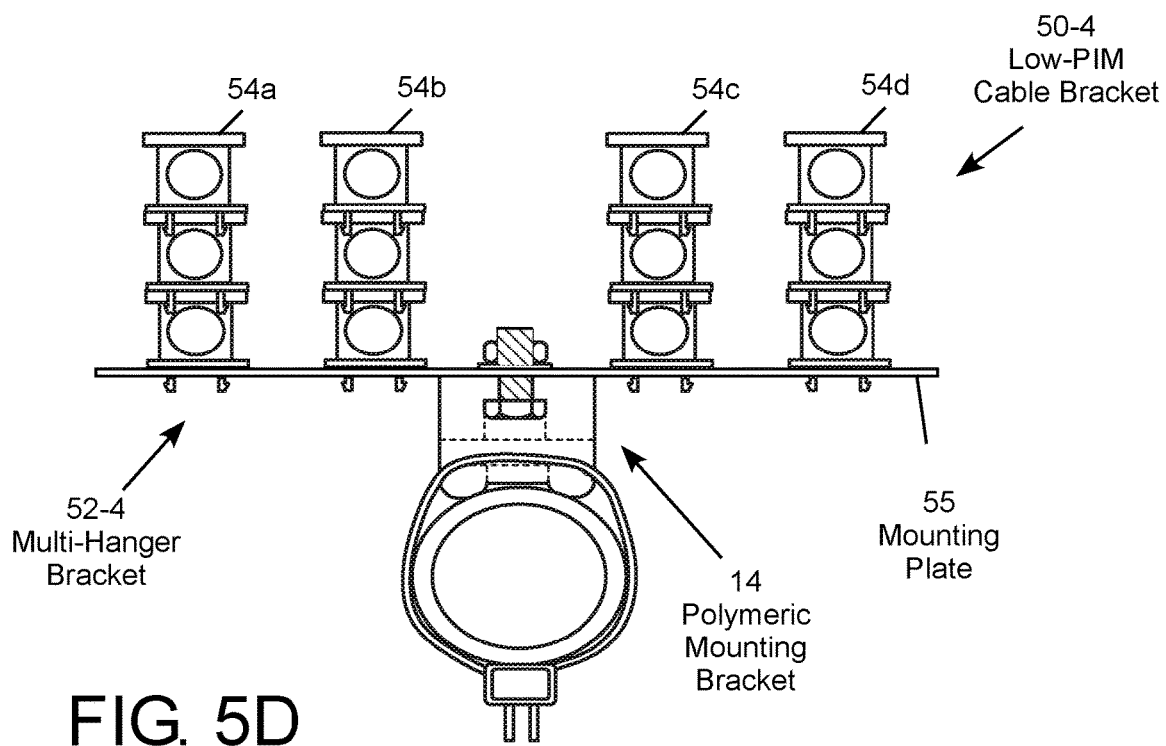
FIG. 5D is a top view of another type of low-PIM cable bracket with a fourth type of multi-hanger bracket.

FIG. 5B is a top view of another type of low-PIM cable bracket 50-2 with a second type of multi-hanger bracket 52-2. In this example, the multi-hanger bracket has a rectangular shape in which one of the longer sides is attached to the mounting bracket 14 by a fastener rod (e.g., bolt) 51 and an opposing longer side provides three holes for receiving three side-be-side stacks of the single-cable hangers 53. FIG. 5C shows another type of low-PIM cable bracket 50-3 with a third type of multi-hanger bracket 52-3. In this example, the multi-hanger bracket 52-3 has a shorter side that mounts to the mounting bracket 14, while each longer side has holes for receiving three side-by-side stacks of the stackable single-cable hangers 53. FIG. 5D shows another type of low-PIM cable bracket 50-4 with a fourth type of multi-hanger bracket 52-4. In this example, the multi-hanger bracket 52-4 is a flat plate with four aligned receptacles for receiving stackable single-cable hangers. These specific interface brackets are merely illustrative, and other types of multi-hanger interface brackets may be employed.

Figure 6:
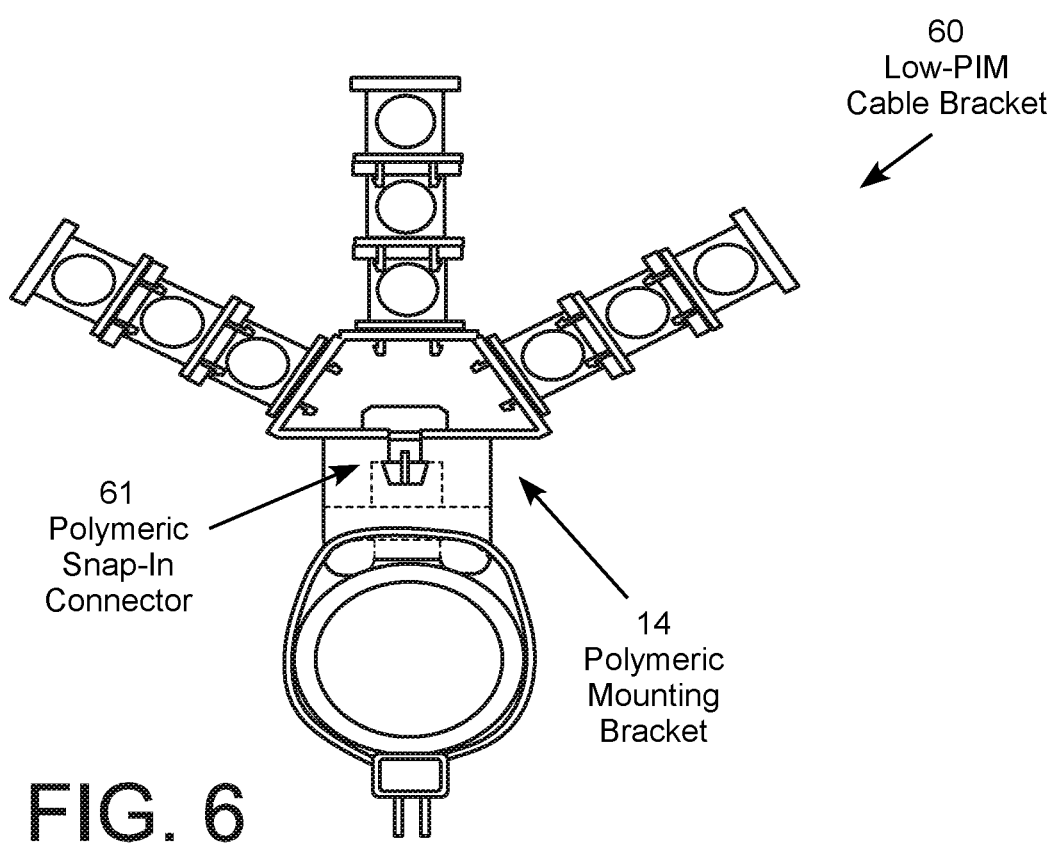
FIG. 6 is a top view of another type of low-PIM cable bracket.

FIG. 6 is a top view of another type of low-PIM cable bracket 60. This embodiment is similar to the low-PIM cable bracket 50-1 shown in FIG. 5A, except that the fastener rod 51 has been replaced by a polymeric snap-in connector. This is avoids a metal-to-metal potential PIM source when the multi-hanger interface bracket is metallic.

Figure 7:
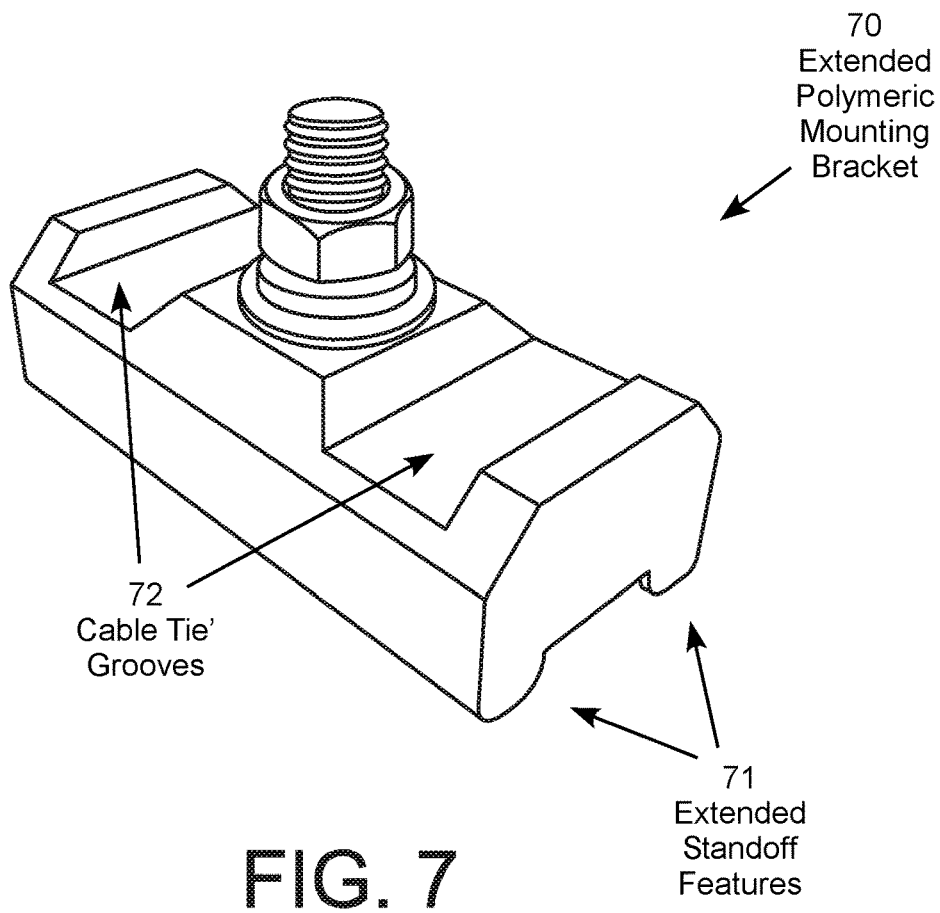
FIG. 7 is a top perspective view of an extended low-PIM mounting bracket.
Figure 8:
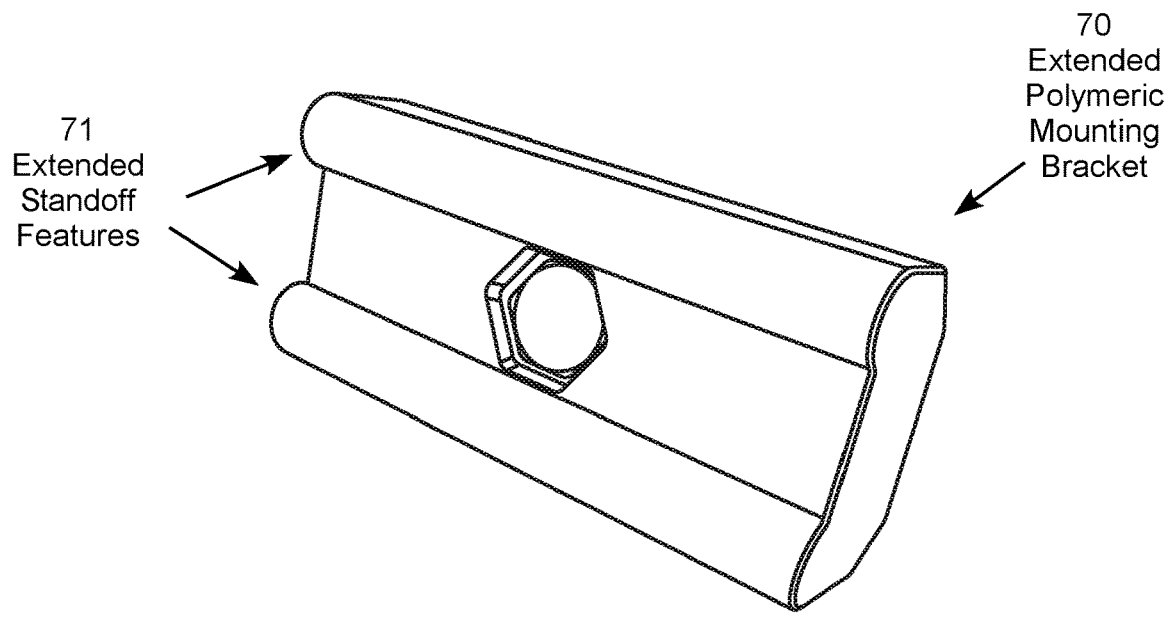
FIG. 8 is a bottom perspective view of the extended low-PIM mounting bracket.

FIG. 7 is a top perspective view and FIG. 8 is a bottom perspective view of an extended low-PIM polymeric mounting bracket 70. This example is provided to demonstrate a longer mounting bracket with longer standoff features 71 to provider greater stability for the pole-mount connection. This example also shows an alternate type cable tie connection, in which two cable ties are tightened into cable tie grooves molded into the mounting bracket 70.

Figure 9:
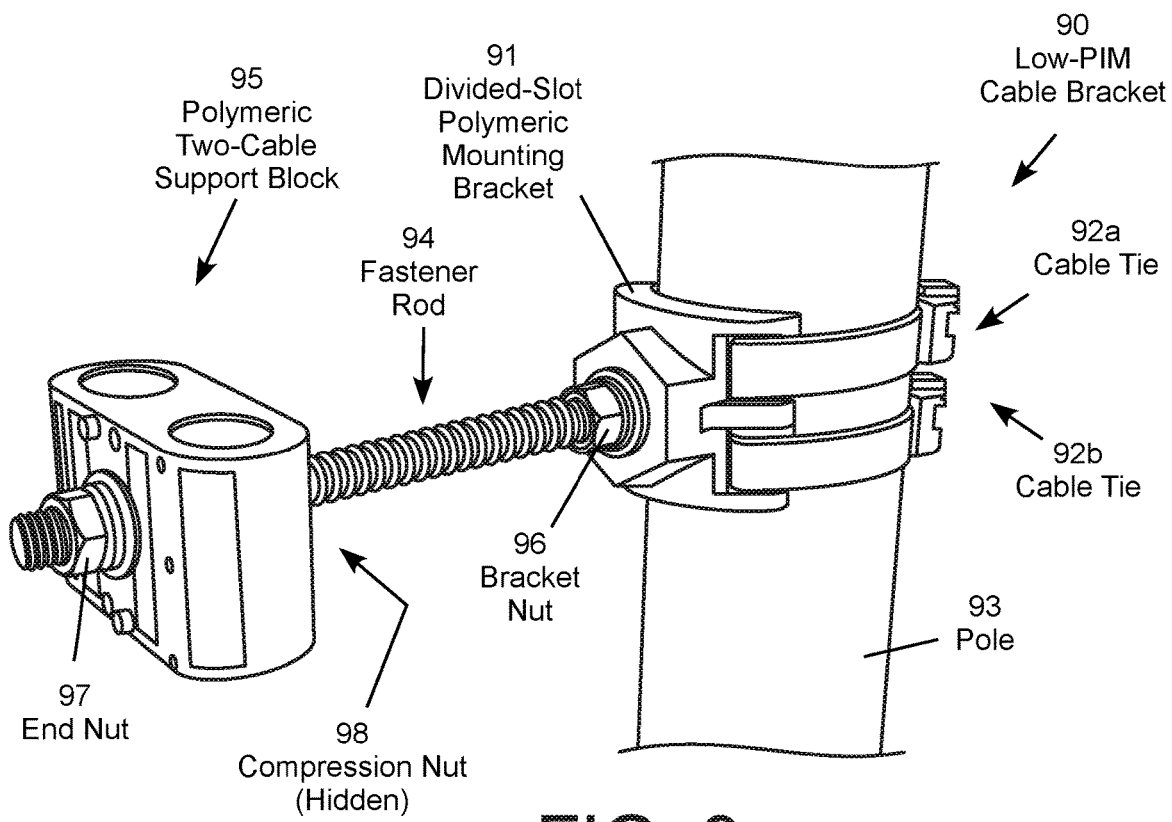
FIG. 9 is a perspective view of another type of low-PIM cable bracket.

FIG. 9 is a perspective view of another type of low-PIM cable bracket 90. In this example, a divided-slot polymeric mounting bracket 91 and a pair of cable ties 92*a*-*b* attach the bracket to a pole 93 or other support member. A fastener rod 94 supports a polymeric two-cable support block 95 from the mounting bracket 91. A bracket nut secures the fastener rod 94 to the mounting bracket 91, while an end nut 97 and a compression nut 98 (hidden in this view) secure the support block 95 spaced apart from the mounting bracket 91 along the fastener rod 94.

Figure 10:
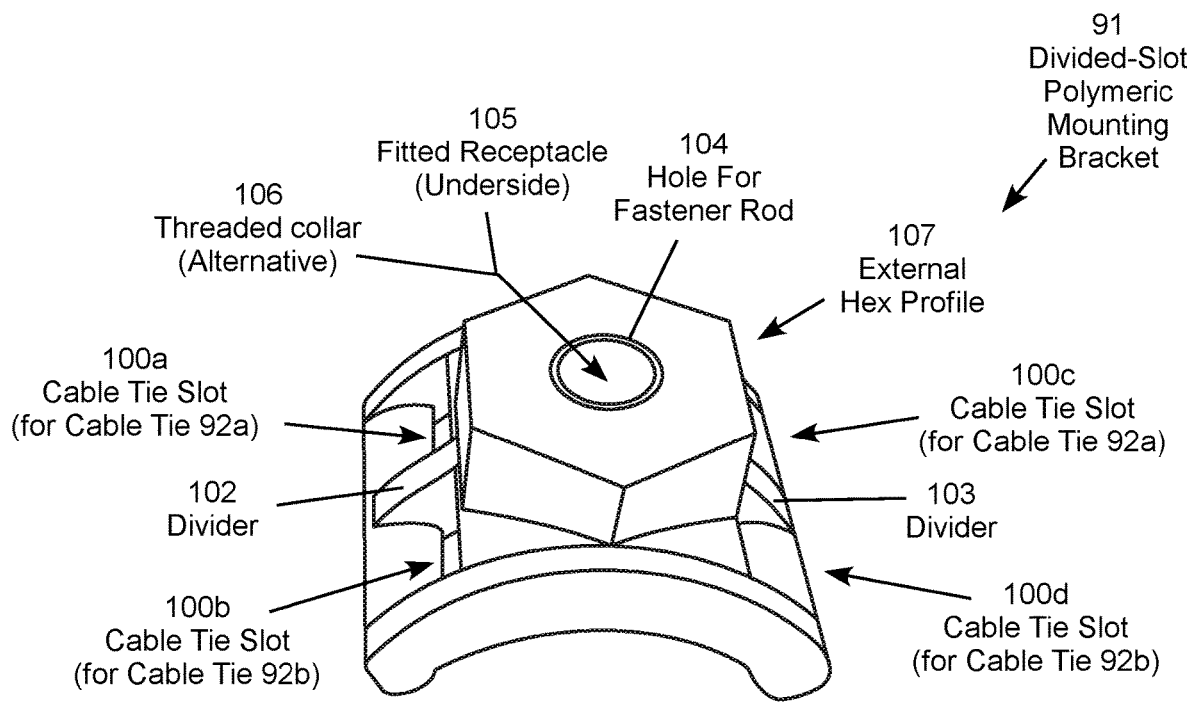
FIG. 10 is a perspective view of a divided-slot low-PIM mounting bracket.

FIG. 10 is a perspective view of the divided-slot polymeric mounting bracket 91, which includes a first set of cable tie slots 100*a*-*b* separated by a first divider 102 on one side of the mounting bracket, and a second set of cable tie slots 100*c*-*d* separated by a second divider 103 on the opposing side of the mounting bracket. The cable tie slots 100*a*-*b* and dividers 102, 103 maintain the cable ties 92*a*-*b* extending through the slots in place to facilitate installation of the mounting bracket 91 on the pole 93. The mounting bracket 91 also includes a hole 104 for receiving the fastener rod 94 aligned with a fitted receptacle 105 on the underside of the mounting bracket 91, similar to the threaded receptacle 40 shown in FIG. 4. Again in this embodiment, cable ties inserted through the cable tie slots 100*a*-100*c* and 100*b*-100*d* prevent a bracket end fastener (e.g., bolt heads or end nut) received in the fitted receptacle 105 from falling out of the fitted receptacle, which facilitates installation by preventing the bracket end fastener from slipping or inadvertently falling out of the mounting bracket 91 while installing the mounting bracket on a pole or other support member. This arrangement prevents the cable ties and the bracket end fastener from falling out of the mounting bracket while the technician attempts to install the mounting bracket on the pole. The mounting bracket 91 also includes an external hex profile 107 designed to receive a wrench to prevent the mounting bracket from slipping or rotating during installation and tightening on the pole or other support member. For example, the hex profile 107 may be 1¼ inches across the flats, which is the same wrench size used to for 7-16 DIN RF connectors already used widely by installers at cellular base station sites.

As an alternative to the fitted receptacle 105, the hole 104 may include a threaded collar 106 for receiving the fastener rod 94, which allows the fastener rod to be attached to the mounting bracket 91, and changed out, after the bracket has been attached to the pole, which further facilitates the installation. This alternative may also be convenient for a retrofit installation utilizing a new mounting bracket 91 to be connected to a preexisting fastener rod 94. In this case, the new mounting bracket can be easily threaded onto the preexisting fastener rod, and then secured with polymeric cable ties to the pole or other support member, without having to disassemble the other elements of the cable support assembly connected to the fastener rod.

Additional embodiments may use clamp-style cable hangers that are screwed onto and tightened along the threaded fastener rod at desired positions. This embodiment includes a low-PIM polymeric mounting bracket attached to a pole with a threaded rod that also supports one or more clamp-style cable hangers. For example, a particular arrangement may include a low-PIM polymeric mounting bracket supporting two clamp-type cable hanger from a common fastener rod. These cable arrangements are typically found behind cellular base station antennas within one carrier wavelength of the antenna (i.e., one wavelength of the base station uplink or downlink carrier frequency). The low-PIM embodiments represent good retrofit alternatives for existing clamp-type cable support arrangements where the pole bracket in the preexisting cable arrangement is identified as the source of the problematic PIM interference. In this scenario, the mounting bracket is replaced while the preexisting clamp-type cable support(s) need not be replaced. In addition, the low-PIM cable bracket 90 with the threaded fastener rod receptacle 105 shown in FIGS. 9-10 may further facilitate attaching of the preexisting cable-type cable support block to the new mounting bracket. As another option, a hand-held PIM probe as described in Bell, U.S. Pub. 2018-0088161, which is incorporated by reference, may be used to identify the problematic mounting bracket in the preexisting cable arrangement.

While particular aspects of the present subject matter have been shown and described in detail, it will be apparent to those skilled in the art that, based upon the teachings of this disclosure, changes and modifications may be made without departing from the subject matter described in this disclosure and its broader aspects and, therefore, the appended claims are to encompass within their scope all such changes and modifications as are within the true spirit and scope of the subject matter described in this disclosure. Although particular embodiments of this disclosure have been illustrated, it is apparent that various modifications and embodiments of the disclosure may be made by those skilled in the art without departing from the scope and spirit of the disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes. The disclosure is defined by the following claims, which should be construed to encompass one or more structures or function of one or more of the illustrative embodiments described above, equivalents and obvious variations. It will therefore be appreciated that the present invention provides significant improvements. The foregoing relates only to the exemplary embodiments of the present invention, and that numerous changes may be made therein without departing from the spirit and scope of the invention as defined by the following claims.

The invention claimed is:

1. A low-PIM cable bracket, comprising:
a polymeric mounting bracket;
a cable support block supported by the mounting bracket;
a fastener rod comprising a threaded rod terminated by a bracket end fastener comprising a bolt head or end nut connecting the mounting bracket to the cable support block;
one or more polymeric cable ties, each cable tie elongated along a length dimension for attaching the mounting bracket to a support member by wrapping the cable tie around the support member with the length dimension extending around the support member;
wherein the mounting bracket further comprises a pair of spaced apart standoff features configured for supporting the mounting bracket against a range of support member poles having different diameters;
wherein the standoff features are spaced apart along the length dimension of the one or more cable ties;
wherein the mounting bracket further comprises a fitted receptacle for capturing the bolt head or end nut to prevent the bracket end fastener from rotating with respect to the mounting bracket.

2. The low-PIM cable bracket of claim 1, wherein the mounting bracket further comprises a pair of slots for receiving the one or more polymeric cable ties.

3. The low-PIM cable bracket of claim 1, wherein the cable support block comprises a channel through the cable support block for supporting a cable passing through the channel transverse to the length dimension of the one or more cable ties.

4. The low-PIM cable bracket of claim 3, wherein the mounting bracket further comprises an external hex profile configured to receive a wrench to facilitate tightening the mounting bracket onto the support member or a fastener rod.

5. The low-PIM cable bracket of claim 1,
wherein the mounting bracket further comprises an external hex profile configured to receive a wrench to facilitate tightening the mounting bracket onto the support member or a fastener rod.

6. The low-PIM cable bracket of claim 1,
wherein the mounting bracket and the cable support block are spaced apart along the fastener rod.

7. The low-PIM cable bracket of claim 1, further comprising a multi-hanger bracket connected to the mounting bracket configured to receive one or more stacks of stackable single-cable hangers.

8. The low-PIM cable bracket of claim 1, further comprising a multi-hanger bracket connected to the mounting bracket comprising one or more support faces, wherein each support face is configured to receive a stack of stackable single-cable hangers.

9. The low-PIM cable bracket of claim 1, further comprising a multi-hanger bracket connected to the mounting bracket comprising a support face configured to receive a plurality of side-by-side stacks of stackable single-cable hangers.

10. The low-PIM cable bracket of claim 1, further comprising a multi-hanger bracket connected to the mounting bracket comprising a plurality of support faces that are each configured to receive a plurality of side-by-side stacks of stackable single-cable hangers.

11. The low-PIM cable bracket of claim 1, further comprising a multi-hanger bracket connected to the mounting bracket by a polymeric snap-in connector.

12. The low-PIM cable bracket of claim 1,
wherein the mounting bracket further comprises a first pair of grooves configured to receive two cable ties in side-by-side position.

13. The low-PIM cable bracket of claim 1,
wherein the mounting bracket further comprises a first pair of slots separated by a first divider for receiving two cable ties in a side-by-side position, further comprising a second pair of slots slot separated by a second divider for receiving the two cable ties in the side-by-side position.

14. The low-PIM cable bracket of claim 1, wherein the mounting bracket consists essentially of injection molded plastic.

15. The low-PIM cable bracket of claim 1, wherein the mounting bracket further comprises a pair of slots for receiving the cable tie of the one or more cable ties.

16. The low-PIM cable bracket of claim 15, wherein the fitted receptacle is positioned so that the cable tie of the one or more cable ties blocks the fastener rod from falling out of the fitted receptacle.

17. A low-PIM cable bracket, comprising:
a polymeric mounting bracket;
a cable support block supported by the mounting bracket;
a fastener rod comprising a threaded rod connecting the mounting bracket to the cable support block;
one or more polymeric cable ties for attaching the mounting bracket to a support member, each cable tie elongated along a length dimension for attaching the mounting bracket to a support member by wrapping the cable tie around the support member with the length dimension extending around the support member;
wherein the mounting bracket further comprises a threaded receptacle for receiving the fastener rod,
wherein the cable support block comprises a channel through the cable support block for supporting a cable passing through the channel transverse to the length dimension of the one or more cable ties.

18. A low-PIM mounting bracket, comprising:
a polymeric body comprising two or more spaced apart standoff features configured for supporting the mounting bracket against a range of support member poles having different diameters;
a first pair of slots separated by a first divider for receiving first and second cable ties in cable ties in side-by-side position, and a second pair of slots separated by a second divider for receiving the two cable ties in the side-by-side position;
a fitted receptacle for receiving a bracket end fastener of a fastener rod positioned so that the first and second cable ties received through the first and second pairs of slots block the bracket end fastener from falling out of the fitted receptacle;
an external hex profile configured to receive a wrench to facilitate tightening the mounting bracket onto the support member poles or a fastener rod.

19. The low-PIM cable bracket of claim 18, wherein the mounting bracket further comprises a pair of polymeric cable ties received through the first and second pairs of slots.

* * * * *